US010424053B2

United States Patent
Yurlov et al.

(10) Patent No.: US 10,424,053 B2
(45) Date of Patent: Sep. 24, 2019

(54) IMAGE CORRECTION APPARATUS AND METHOD

(71) Applicant: Samsung Electro-Mechanics Co., Ltd., Suwon-si (KR)

(72) Inventors: Victor Yurlov, Suwon-si (KR); Bok Young Hong, Suwon-si (KR); Young Kyun Lee, Suwon-si (KR); Won Seok Park, Suwon-si (KR); Myung Gu Kang, Suwon-si (KR); Dae Sik Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 65 days.

(21) Appl. No.: 15/703,714

(22) Filed: Sep. 13, 2017

(65) Prior Publication Data
US 2018/0165797 A1   Jun. 14, 2018

(30) Foreign Application Priority Data
Dec. 13, 2016   (KR) .................... 10-2016-0169834

(51) Int. Cl.
*G06T 5/00* (2006.01)
*G06F 17/14* (2006.01)
*G06T 5/10* (2006.01)

(52) U.S. Cl.
CPC .............. *G06T 5/003* (2013.01); *G06F 17/14* (2013.01); *G06T 5/002* (2013.01); *G06T 5/007* (2013.01); *G06T 5/10* (2013.01); *G06T 2207/20048* (2013.01); *G06T 2207/20056* (2013.01); *G06T 2207/20192* (2013.01); *G06T 2207/20201* (2013.01)

(58) Field of Classification Search
CPC ......... G06T 5/002; G06T 5/003; G06T 5/007; G06T 5/10; G06T 2207/20056; G06T 2207/20048; G06T 2207/20192; G06T 2207/20201; G06F 17/14
USPC ........................................ 382/254, 274, 280
See application file for complete search history.

(56) References Cited

U.S. PATENT DOCUMENTS 8,482,659 B2 *   7/2013   Tamura .............. H04N 5/23229
                                                             348/349
2010/0166332 A1   7/2010   Lee et al.
(Continued)

FOREIGN PATENT DOCUMENTS

| JP | 2010-157210 A | 7/2010 |
| JP | 2011-45078 A | 3/2011 |
| WO | WO 2013/165595 A1 | 11/2013 |

OTHER PUBLICATIONS

Qian (Image enhancement methods and applications in computational photography), pp. 1-27, LDU Digital Commons. (Year: 2014).*

*Primary Examiner* — Daniel G Mariam
(74) *Attorney, Agent, or Firm* — NSIP Law

(57) ABSTRACT

An image correction apparatus includes an image correction processor configured to generate an image intensity gradient for each of areas of a pre-corrected image, generate a weight coefficient that is dependent on the image intensity gradient, generate a correction transfer function in which the weight coefficient is applied, generate an output value of a corrected image from an image intensity by applying the correction transfer function, and generate the corrected image based on the output value.

14 Claims, 4 Drawing Sheets

(56) References Cited

U.S. PATENT DOCUMENTS

| | | | |
|---|---|---|---|
| 2011/0044554 A1* | 2/2011 | Tian | G06T 5/003 |
| | | | 382/255 |
| 2015/0103214 A1 | 4/2015 | Chen et al. | |
| 2017/0301066 A1* | 10/2017 | Wang | G06T 7/11 |

* cited by examiner

IMAGE CORRECTION APPARATUS AND METHOD

CROSS-REFERENCE TO RELATED APPLICATIONS

This application claims benefit under 35 U.S.C. § 119(a) of Korean Patent Application No. 10-2016-0169834 filed on Dec. 13, 2016 in the Korean Intellectual Property Office, the entire disclosure of which is incorporated herein by reference for all purposes.

BACKGROUND

1. Field

The following description relates to an image correction apparatus, for example, an image correction processor and an image correction computer readable recording medium, and a method to perform image correction.

2. Description of Related Art

Recently, techniques for improving image quality by correcting an image received from an image acquisition device, such as a camera, have been actively researched.

The image acquisition device may acquire a blurred image due to hand-shake or environmental factors. The quality of the blurred image may be improved by correction.

However, existing image correction processes may cause additional noise or cause excessive power and time consumption due to excessive data processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image correction apparatus includes an image correction processor configured to generate an image intensity gradient for each of areas of a pre-corrected image, generate a weight coefficient that is dependent on the image intensity gradient, generate a correction transfer function in which the weight coefficient is applied, generate an output value of a corrected image from an image intensity by applying the correction transfer function, and generate the corrected image based on the output value.

The image correction processor may be further configured to perform a Fourier transform on the image intensity, calculate the output value corresponding to the product of the Fourier transformed image intensity and the correction transfer function, and perform an inverse Fourier transform on the output value.

The image correction processor may be further configured to generate the correction transfer function using either one or both of Tikhonov regularization and Gaussian regularization.

The image correction processor may be further configured to apply the generated weight coefficient to either one or both of a weight coefficient of the Tikhonov regularization and a weight coefficient of the Gaussian regularization. The generated weight coefficient may be reduced as the image intensity gradient increases.

The image correction processor may be further configured to generate the weight coefficient so that a value corresponding to the image intensity gradient and the weight coefficient form either one of an exponential function and a logarithmic function.

The image correction processor may be further configured to generate an average value of the image intensity gradients. The weight coefficient may be dependent on the average value.

The image correction processor may be further configured to apply the image intensity $b(x, y)$ to $$\nabla b = \sqrt{\left[\frac{\partial}{\partial x}b(x, y)\right]^2 + \left[\frac{\partial}{\partial y}b(x, y)\right]^2} \text{ and}$$

$$w(\nabla b) = \frac{1}{1 + w_{00}}\left(w_{00} + \exp\left\{\frac{-[\nabla b]^2}{\sigma^2}\right\}\right)$$

to generate the weight coefficient $w(\nabla b)$, generate an average value of the image intensity gradients, and change either one or both of $w_{00}$ and $\sigma$ in response to the average value changing, wherein $w_{00}$ is a bias value and $\sigma$ is a reference value.

The image correction apparatus may further include: a memory storing a first equation, a second equation, a third equation, and a fourth equation. The image correction processor may be configured to receive the first equation, the second equation, the third equation, and the fourth equation from the memory, generate the image intensity gradient using the first equation, generate the weight coefficient using the second equation, generate the correction transfer function using the third equation, and calculate the output value using the fourth equation.

The image correction processor may include: an image intensity processor configured to generate the image intensity gradient; a weight coefficient processor configured to generate the weight coefficient; a correction transfer function processor configured to generate the correction transfer function; and a corrector configured to generate the output value of the corrected image.

In another general aspect, a non-transitory computer-readable storage medium stores instructions that, when executed by a processor, cause the processor to perform an image correction method by: generating an image intensity gradient for each of areas of a pre-corrected image; generating a weight coefficient that is dependent on the image intensity gradient; generating a correction transfer function in which the weight coefficient is applied; generating an output value of a corrected image from an image intensity by applying the correction transfer function; and generate the corrected image based on the output value.

In another general aspect, a method to perform image correction includes: generating an image intensity gradient for each of areas of a pre-corrected image; generating a weight coefficient based on the image intensity gradient; generating a correction transfer function comprising the weight coefficient; generating an output value from an image intensity by applying the correction transfer function; and correcting the pre-corrected image based on the output value.

The correcting of the pre-corrected image may include correcting a first area, among the areas, at a correction level that is higher than a correction level of a second area, among the areas.

The image intensity gradient of the first area may be smaller than the image intensity gradient of the second area.

The output value may be based on a Fourier transform of the image intensity.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, example embodiments of the present disclosure will be described in detail with reference to the accompanying drawings.

Figure 1:
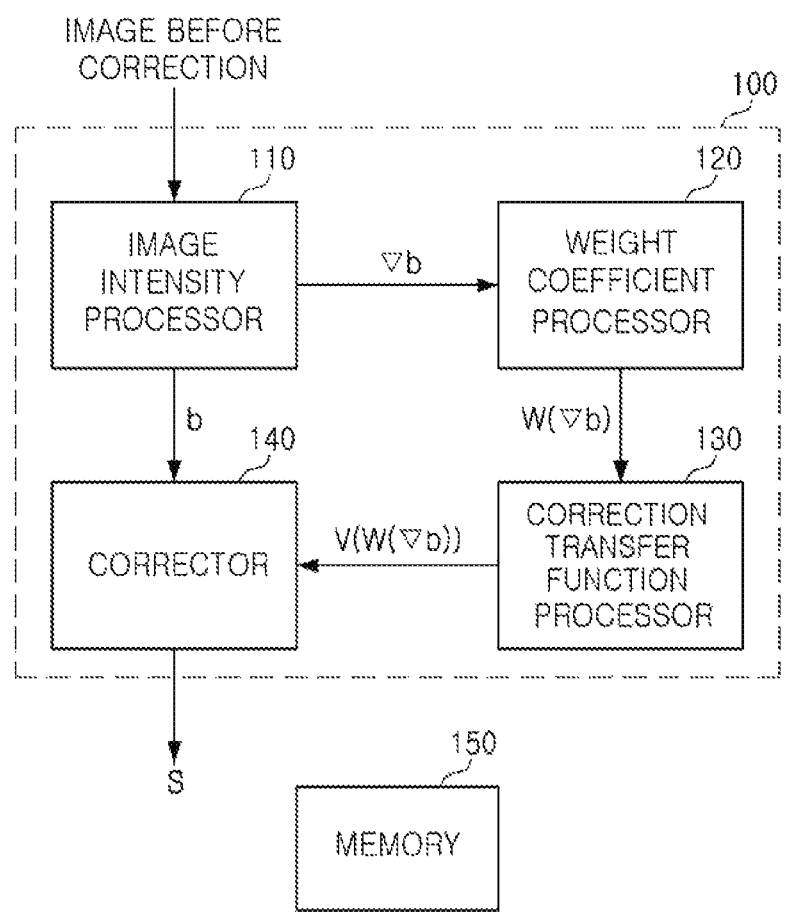
FIG. 1 is a block diagram illustrating an image correction processor, according to an embodiment.

FIG. 1 is a block diagram illustrating an image correction processor 100, according to an embodiment.

Referring to FIG. 1, the image correction processor 100 includes an image intensity processor 110, a weight coefficient processor 120, a correction transfer function processor 130, a corrector 140, and a memory 150. For example, the image correction processor 100 is implemented by an image acquisition device such as a camera or a computing environment embedded in the image acquisition device.

The image intensity processor 110 generates an image intensity gradient ($\nabla b$) for each area of a pre-corrected image. For example, the pre-corrected image is a blurred image, and the area corresponds to a pixel or a set of pixels.

The image intensity processor 110 receives the pre-corrected image from the image acquisition device and generates an image intensity from the pre-corrected image. In addition, the image intensity processor 110 receives the image intensity from an external component.

If the pre-corrected image is a color image, the image intensity may include a red (or cyan) image intensity, a green (or yellow) image intensity, and a blue (or magenta) image intensity that are processed independently of each other.

The image intensity gradient is a parameter indicating a total difference value between an image intensity for the corresponding area of the pre-corrected image and image intensities for areas adjacent to the corresponding area of the pre-corrected image. Therefore, an image intensity gradient for a blurred area in the pre-corrected image may be small, and an image intensity gradient for a clear area in the pre-corrected image may be large.

The weight coefficient processor 120 generates a weight coefficient $W(\nabla b)$ that is dependent on the image intensity gradient.

The correction transfer function processor 130 generates a correction transfer function $V(w(\nabla b))$ in which the weight coefficient is reflected.

The corrector 140 generates an output value S of a corrected image from the image intensity by applying the correction transfer function.

The correction transfer function may have different characteristics in the correction intensity with respect to the image intensity depending on the weight coefficient. The large correction intensity makes the corresponding area of the pre-corrected image sharper, but may cause additional noise due to the correction.

Since the weight coefficient reflected in the correction transfer function is dependent on the image intensity gradient, the corrector 140 may correct an area, in which the image intensity gradient is small in the pre-corrected image, at a high level, and may correct an area, in which the image intensity gradient is large in the pre-corrected image, at a low level.

Since the image intensity gradient corresponds to a blurred level of the corresponding area, the correction unit 140 may correct the blurred area in the pre-corrected image at a high level and may correct the clear area in the pre-corrected image at a low level. As a result, the corrected image has high image quality and low noise.

That is, a signal-to-noise ratio (SNR) of the corrected image is improved, and power consumption or required specifications of peripheral components affecting the signal-to-noise ratio of the image are lowered.

In addition, the corrector 140 performs an integrated correction on an area, in which blurred levels are diverse in the pre-corrected image, at various correction intensities. Therefore, the total data throughput required to obtain the corrected image that has the high image quality and the low noise is reduced. Accordingly, the efficiency of image correction is high.

The memory 150 stores equations provided to generate parameters of the image intensity processor 110, the weight coefficient processor 120, the correction transfer function processor 130, and the corrector 140 therein. For example, the memory 150 stores equations to be described below therein.

For example, the image corrector 100 performs a process of generating an output value of a corrected image from an image intensity of a pre-corrected image as described below.

An image intensity for an x coordinate is expressed, for example, by the following Equation 1. In Equation 1, x is a continuous coordinate, $x_1$ is a single point position, t is a small pixel pitch, $\Delta$ is a small pixel size, and $X_0$ is a full frame size, rect(x) is a rectangular function, and $\delta(x)$ is a Dirac Delta function which may be expressed by the following Equation 2.

$$b(x) = \int_{X_0} b(x_1)\delta(x-x_1)dx_1 = \quad \text{[Equation 1]}$$

$$\int_{X_0} db(x, x_1) = \lim_{t \to 0} \lim_{\Delta \to 0} \sum_{i=0}^{\text{round}(X_0/t)} \frac{b(it)}{\Delta} \text{rect}\left(\frac{x-it}{\Delta}\right)$$

$$\delta(x) = \lim_{\Delta \to 0} \frac{\text{rect}\left(\frac{x}{\Delta}\right)}{\Delta} \quad \delta(x) = \lim_{\Delta \to 0} \frac{\text{rect}\left(\frac{x}{\Delta}\right)}{\Delta} \quad \text{[Equation 2]}$$

The partial relationship of the above Equation 1 is expressed by the following Equation 3.

$$db(x,x_1)=b(x_1)\delta(x-x_1)dx_1 \quad \text{[Equation 3]}$$

The above Equation 3 is expressed, for example, by the following Equation 4 based on Fourier transform. In Equation 4, $\omega$ is a circular spatial frequency and $dB(\omega, x_1)$ is a spatial spectrum of image intensity.

$$dB(\omega,x_1)=\int db(x,x_1)\exp\{-j\omega x\}dx=b(x_1)\exp\{-j\omega x_1\}dx_1 \quad \text{[Equation 4]}$$

A correction transfer function $V(\omega)$ is applied to a Fourier transformed image intensity as expressed by the following Equation 5, and an output value $dS(\omega, x_1)$ of the corrected image is calculated.

$$dS(\omega,x_1)=dB(\omega,x_1)V(\omega)=b(x_1)\exp\{-j\omega x_1\}dx_1V(\omega) \quad \text{[Equation 5]}$$

In Equation 5, the correction transfer function $V(\omega)$ may be derived from an inverse transfer function for Tikhonov regularization as expressed by the following Equation 6, and may be derived from an inverse transfer function for Gaussian regularization as expressed by the following Equation 7. In Equations 6 and 7, $\xi$ and $\eta$ are each spatial circular frequencies with respect to x and y directions and may be represented by rad/pixel, H is an optical transfer function that is derived by two-dimensional Fourier transform of a point spread function (PSF) of a lens, * is a complex conjugation, and w is a weight coefficient.

$$V(\xi, \eta) = \frac{H^*(\xi, \eta)}{|H(\xi, \eta)|^2 + w^2} \quad \text{[Equation 6]}$$

$$V(\xi, \eta) = \frac{H^*(\xi, \eta)}{|H(\xi, \eta)|^2 + w^2(\xi^2 + \eta^2)} \quad \text{[Equation 7]}$$

The output value $dS(\omega, x_1)$ of the corrected image of the above Equation 5 is expressed, for example, by the following Equation 8 based on inverse Fourier transform.

$$ds(x,x_1)=(2\pi)^{-1}\int dS(\omega,x_1)\exp\{j\omega x\}d\omega=b(x_1)v(x-x_1)dx_1 \quad \text{[Equation 8]}$$

The correction transfer function $V(\omega)$ of the above Equation 5 is expressed, for example, by the following Equation 9 based on inverse Fourier transform.

$$v(x)=(2\pi)^{-1}\int V(\omega)\exp\{j\omega x\}d\omega \quad \text{[Equation 9]}$$

Since the weight coefficient w of the correction transfer function $V(\omega)$ is variable, the correction transfer function $V(\omega)$ is expressed, for example, by the following Equation 10 using the weight coefficient w as a variable.

$$v(x-x_1,w(x))=(2\pi)^{-1}\int V(\omega,w(x))\exp\{j\omega(x-x_1)\}d\omega \quad \text{[Equation 10]}$$

In the above Equation 10, the correction transfer function V(w, w(x)) may be expressed by the following Equation 11 from the above Equation 6 or may be expressed by the following Equation 12 from the above Equation 7.

$$V(\omega, w) = \frac{H^*(\omega)}{|H(\omega)|^2 + w^2} \quad \text{[Equation 11]}$$

$$V(\omega, w) = \frac{H^*(\omega)}{|H(\omega)|^2 + w^2\omega^2} \quad \text{[Equation 12]}$$

In the above Equation 8, the inverse Fourier transformed output value $ds(x, x_1)$ is expressed, for example, by the following Equation 13. In Equation 13, s(x) is the image intensity of the corrected image.

$$s(x)=\int ds(x,x_1)=\int b(x_1)v(x-x_1,w(x))dx_1 \quad \text{[Equation 13]}$$

For example, the image correction processor 100 performs a process of calculating a correction transfer function derived from an inverse transfer function for Tikhonov regularization in a two-dimensional manner as described below.

The correction transfer function is expressed, for example, by the following Equations 14 to 17. A function f(Z) may be expressed by a power series of a polynomial coefficient ($\psi$m) by the following Equation 17. The polynomial coefficient ($\psi$m) may be calculated by an approximation method such as Vandermonde matrix and polynomial regression. In the following Equations 14 to 17, Z has a range of $0<Z<1/w_m$, in which the $w_m$ is a minimum expectation value of the weight coefficient w.

$$V(j\omega, w) = \frac{H^*(j\omega)}{|H(j\omega)|^2 + w^2} = \frac{\exp\{j\varphi(\omega)\}}{w}f(Z) \quad \text{[Equation 14]}$$

$$Z = \frac{|H(j\omega)|}{w} \quad \text{[Equation 15]}$$

$$\varphi(\omega) = -\arg\{H(j\omega)\} \quad \text{[Equation 16]}$$

$$f(Z) = \frac{Z}{Z^2+1} = \sum_{m=1}^{M-1} \Psi_m Z^m \quad \text{[Equation 17]}$$

For example, correction transfer function of the above Equation 14 is expressed by the following Equations 18 to 20 based on inverse Fourier transform. In Equation 18, IFT is an operator of the inverse Fourier transform. When f(0)=0, $\psi_0$ is zero.

$$v(x - x_1, w(x)) = \sum_{k=1}^{K-1} \frac{\Psi_k}{[w(x)]^{k+1}} g_k(x - x_1) \quad \text{[Equation 18]}$$

$$g_k(x) = (2\pi)^{-1} \int |H(j\omega)|^k \exp\{j[\varphi(\omega) + \omega x]\} d\omega = \quad \text{[Equation 19]}$$
$$IFT\{|H(j\omega)|^k \exp\{j\varphi(\omega)\}\}$$

$$g_1(x) = (2\pi)^{-1} \int H^*(j\omega) \exp\{jx\omega\} d\omega = h(-x) \quad \text{[Equation 20]}$$

For example, the above Equation 18 is expressed as a two-dimensional spatial model by the following Equations 21 and 22.

$$v(x - x_1, y - y_1, w(x, y)) = \quad \text{[Equation 21]}$$
$$\sum_{k=1}^{K-1} \frac{\Psi_k}{[w(x, y)]^{k+1}} g_k(x - x_1, y - y_1)$$

$$g_k(x, y) = \quad \text{[Equation 22]}$$
$$(4\pi^2)^{-1} \int\int |H(\xi, \eta)|^k \exp\{j[\varphi(\xi, \eta) + \xi x + \eta y]\} d\xi d\eta$$

The above Equation 13 is expressed by the following Equation 23 by applying the above Equations 21 and 22.

$$s(x,y)=\iint b(x_1,y_1)v(x-x_1,y-y_1,w(x,y))dx_1 dy_1 \quad \text{[Equation 23]}$$

For example, the image correction processor 100 performs a process of calculating a correction transfer function derived from an inverse transfer function for Gaussian regularization in a two-dimensional manner as described below.

The correction transfer function is expressed, for example, by the following Equations 24 to 26, and the function f(Z) uses the above Equation 17.

$$V(\xi, \eta, w) = \frac{H^*(\xi, \eta)}{|H(\xi, \eta)|^2 + w^2(\xi^2 + \eta^2)} = \frac{\exp\{j\varphi(\xi, \eta)\}}{w\sqrt{\xi^2 + \eta^2}} \cdot f(Z) \quad \text{[Equation 24]}$$

$$Z = \frac{|H(\xi, \eta)|}{w\sqrt{\xi^2 + \eta^2}} \quad \text{[Equation 25]}$$

$$\varphi(\xi, \eta) = -\arg\{H(\xi, \eta)\} \quad \text{[Equation 26]}$$

For example, the correction transfer function of the above Equation 24 is expressed as a two-dimensional spatial model by the following Equations 27 and 28 based on the inverse Fourier transform.

$$v(x - x_1, y - y_1, w(x, y)) = \quad \text{[Equation 27]}$$
$$\sum_{k=1}^{K-1} \frac{\Psi_k}{[w(x, y)]^{k+1}} u_k(x - x_1, y - y_1)$$

$$u_k(x, y) = (4\pi^2)^{-1} \int\int |H(\xi, \eta)|^k \quad \text{[Equation 28]}$$
$$(\xi^2 + \eta^2)^{-\frac{k+1}{2}} \exp\{j[\varphi(\xi, \eta) + \xi x + \eta y]\} d\xi d\eta$$

The above Equation 13 is expressed by the above Equation 23 by applying the above Equations 27 and 28.

For example, the image correction processor 100 performs a process of calculating a weight coefficient dependent on an image intensity gradient as described below.

For example, the image intensity gradient $\nabla b$ is expressed in a two-dimensional manner by the following Equation 29.

$$\nabla b = \sqrt{\left[\frac{\partial}{\partial x} b(x, y)\right]^2 + \left[\frac{\partial}{\partial y} b(x, y)\right]^2} \quad \text{[Equation 29]}$$

The weight coefficient $w(\nabla b)$ having the image intensity gradient as a variable is expressed, for example, by the following Equation 30. In Equation 30, $w_{00}$ is be a bias value and $\sigma$ is a reference value.

$$w(\nabla b) = \frac{1}{1 + w_{00}} \left( w_{00} + \exp\left\{ \frac{-[\nabla b]^2}{\sigma^2} \right\} \right) \quad \text{[Equation 30]}$$

In the above Equation 30, a value corresponding to the image intensity gradient and the weight coefficient may form an exponential function or a logarithmic function. In Equation 30, the value corresponding to the image intensity gradient includes a square of the image intensity gradient.

Accordingly, an area in which the image intensity gradient is equal to or less than $\sigma$ in the pre-corrected image is corrected at a low level, and an area in which the image intensity gradient is equal to or greater than $\sigma$ in the pre-corrected image is corrected at a high level.

Figure 2A:
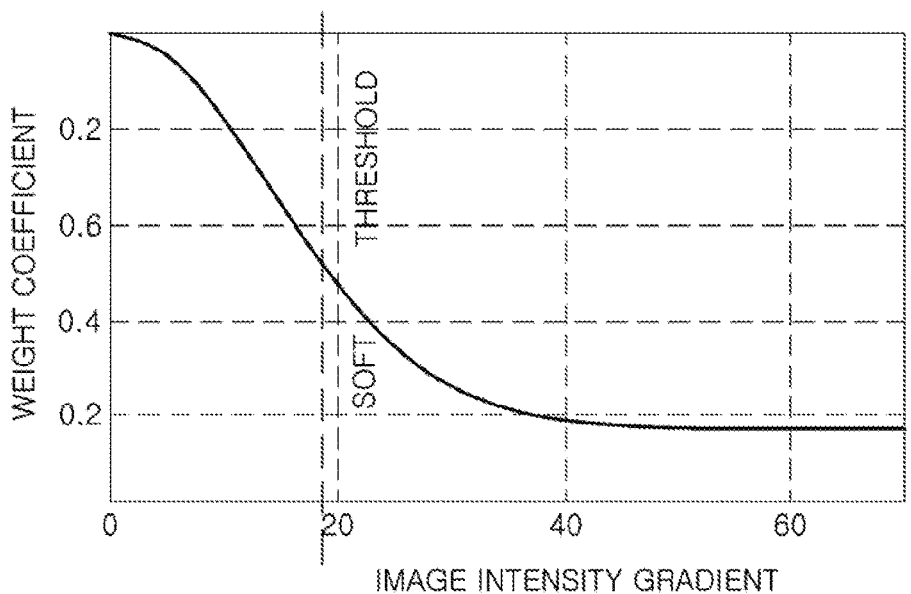
FIG. 2A is a graph illustrating a weight coefficient with respect to an image intensity gradient, according to an embodiment.

FIG. 2A is a graph illustrating a weight coefficient with respect to an image intensity gradient, according to an embodiment.

In FIG. 2A, a relationship between the image intensity gradient and the weight coefficient is a relationship depending on the above Equation 30. Further, $w_{00}$ is assumed to be 0.2 and $\sigma$ (a soft threshold) is assumed to be 20.

A minimum value of the weight coefficient is, for example, $1/(1+w_{00})$. That is, the image correction processor 100 determines the minimum value of the weight coefficient by determining $w_{00}$.

A slope of the weight coefficient is large when the image intensity gradient approaches $\sigma a$. That is, an area in which the image intensity gradient is equal to or less than $\sigma$ in the pre-corrected image is corrected at a relatively low level, and an area in which the image intensity gradient is equal to or greater than $\sigma$ in the pre-corrected image is corrected at a relatively high level.

Accordingly, division between the area corrected at the relatively low level and the area corrected at the relatively high level in the pre-corrected image is determined by $\sigma$.

Figure 2B:
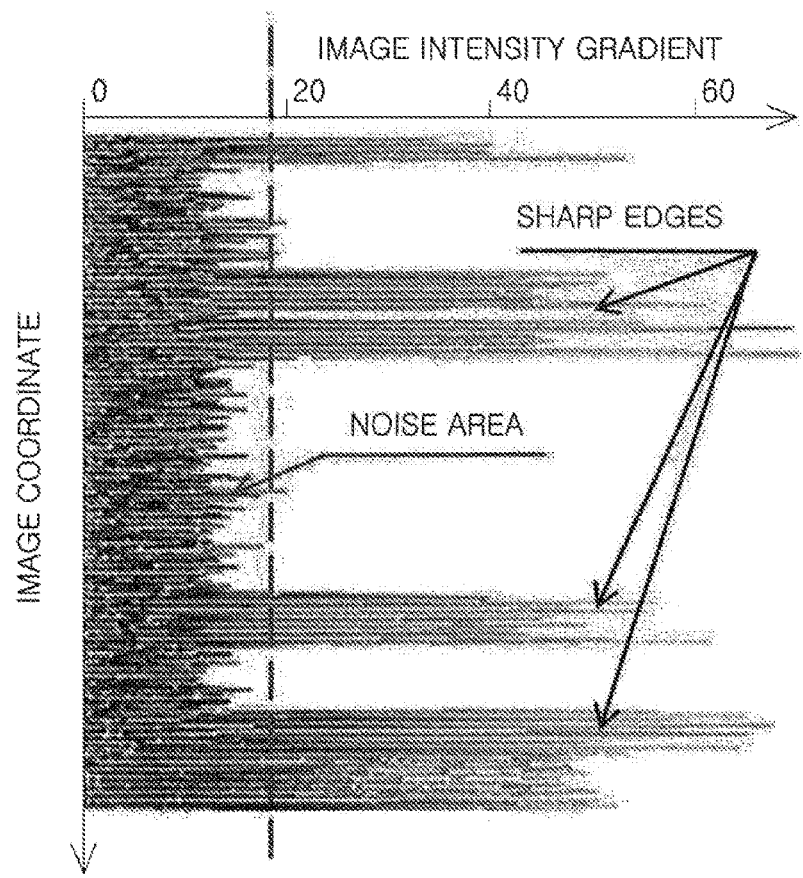
FIG. 2B is a graph illustrating an image intensity gradient with respect to an image coordinate, according to an embodiment.

FIG. 2B is a graph illustrating an image intensity gradient with respect to an image coordinate, according to an embodiment.

In FIG. 2B, image coordinates having an image intensity gradient lower than $\sigma$ has a uniform image intensity gradient due to image noise. The noise may be amplified by a correction process.

The image correction processor 100 corrects a noise area, in which the image intensity gradient is actually surrounded by noise, at a low level and corrects sharp edges, in which the image intensity gradient is large, at a high level, to thereby improve image quality and reduce amplification of noise existing in the image, resulting in improvement of a signal-to-noise ratio.

Meanwhile, a level of the noise may be variable according to a process of acquiring an image. The level of the noise may correspond to an average value of all the image intensity gradients.

The image correction processor 100 may change $w_{00}$ or $\sigma$ of the above Equation 30 based on the average value corresponding to variable characteristics of the noise. That is, the image correction processor 100 may make the weight coefficient generated by the weight coefficient processor 120 correspond to the average value.

For example, the image correction processor 100 adds a coefficient of $w_{00}$ or a coefficient of $\sigma$ corresponding to the average value in the above Equation 30.

As a result, the image correction processor further improves the signal-to-noise ratio.

In an example, a signal-to-noise ratio of the pre-corrected image is 29.1 dB and a signal-to-noise ratio of the corrected image is 31.7 dB.

That is, the image correction processor 100 not only improves the image quality of the pre-corrected image, but also improves the signal-to-noise ratio.

Figure 3:
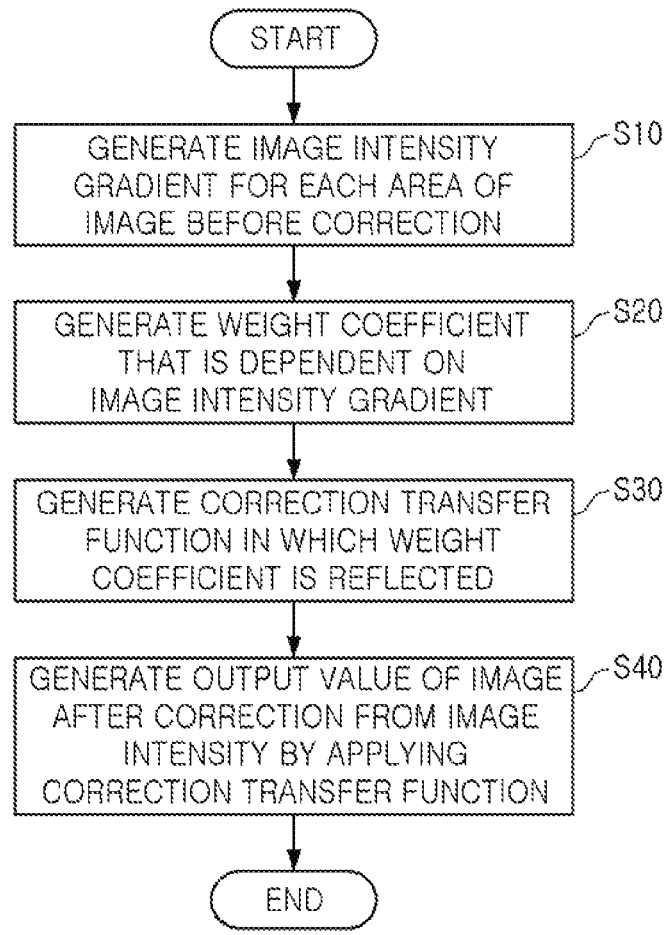
FIG. 3 is a flow chart illustrating an image correction method that may be recorded in a computer readable recording medium and/or performed by an image correction processor, according to an embodiment.

FIG. 3 is a flow chart illustrating an image correction method that may be recorded in a computer readable recording medium and/or performed by the image correction processor 100, according to an embodiment.

Referring to FIG. 3, in operation S10, an image intensity gradient is generated for each area of a pre-corrected image. Next, in operation S20, a weight coefficient that is dependent on the image intensity gradient is generated. Thereafter, in operation S30, a correction transfer function in which the weight coefficient is reflected is generated. Then, in operation S40, an output value of a corrected image from an image intensity is generated by applying the correction transfer function.

The image correction method may be performed by the image correction processor 100, and may be implemented by the computing environment of FIG. 4 described below. For example, the image intensity processor 110, the weight coefficient processor 120, the correction transfer function processor 130, and the corrector 140 that are included in the image correction processor 100 are implemented by the respective areas of one processor or may be implemented by a plurality of processors, respectively. In addition, instructions recorded in the computer readable recording medium and configured to cause the processor(s) to perform the image correction method may be provided to the computing environment via a storage. Further, the pre-corrected image may be transmitted by an input device, and the corrected image may be output by an output device or a communication connection.

Figure 4:
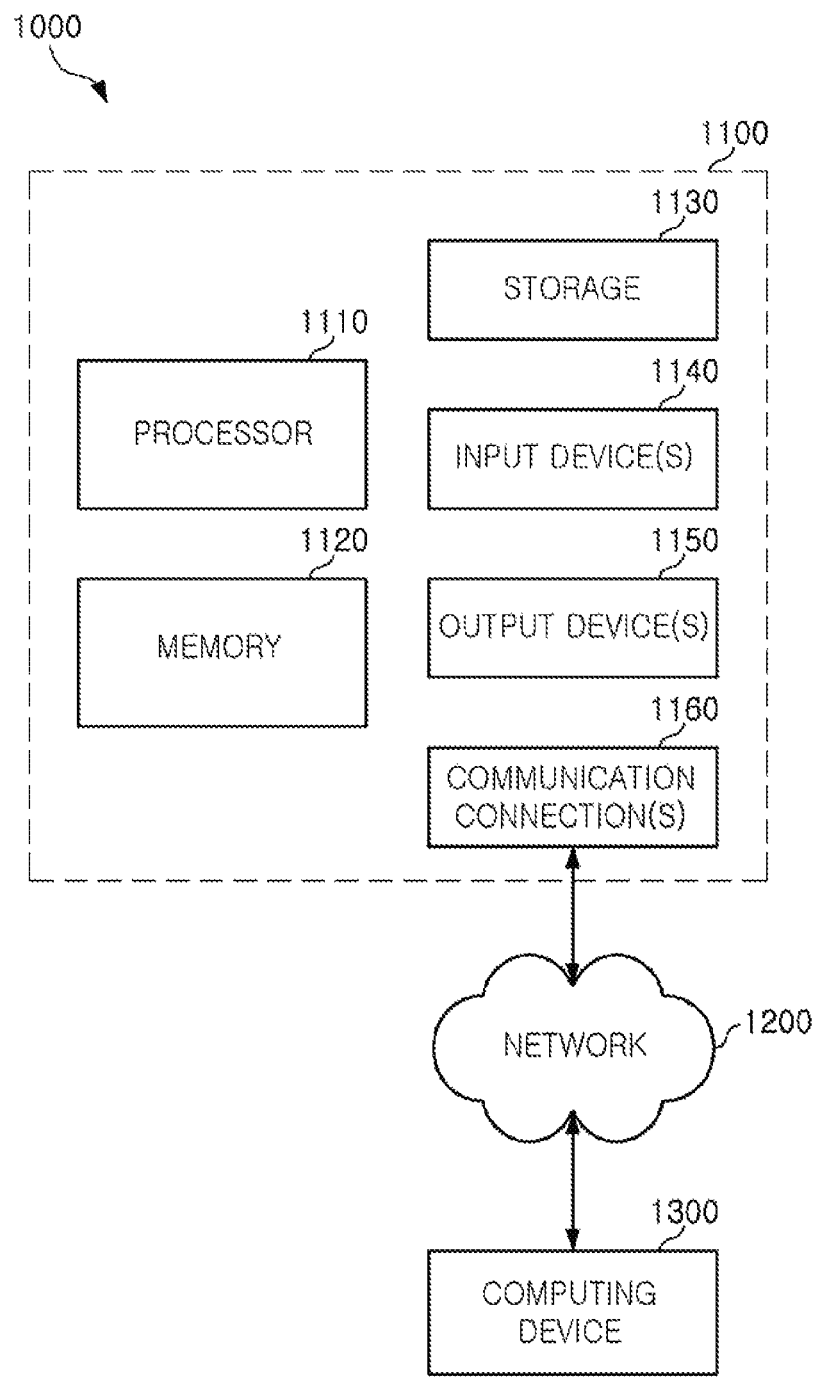
FIG. 4 is a diagram illustrating an example of a computing environment in which one or more embodiments disclosed herein may be implemented.

FIG. 4 is a diagram illustrating an example of a computing environment in which one or more embodiments disclosed herein may be implemented, and illustrates an example of a system 1000 including a computing device 1100 configured to implement one or more example embodiments described above. For example, the computing device 1100 includes a personal computer, a server computer, a handheld or laptop device, a mobile device (a mobile phone, a personal digital assistant (PDA), or a media player), a multiprocessor system, a consumer electronic device, a mini computer, a main frame computer, or a distributed computing environment including any system or device described above. However, the computing device 1100 is not limited to the listed examples.

The computing device 1100 includes at least one processor 1110 and a memory 1120. The processor 1110 includes, for example, a central processing unit (CPU), a graphic processing unit (GPU), a microprocessor, an application specific integrated circuit (ASIC), or a field programmable gate array (FPGA), and may have a plurality of cores. The memory 1120 may be a volatile memory (for example, a random access memory (RAM)), a non-volatile memory (for example, a read only memory (ROM) or a flash memory), or a combination of a volatile memory and a non-volatile memory.

In addition, the computing device 1100 includes a storage 1130. The storage 1130 may include a magnetic storage or an optical storage, but is not limited to these examples. Computer readable instructions for implementing one or more embodiments disclosed herein may be stored in the storage 1130, and other computer readable instructions for implementing an operating system or application programs, for example, may also be stored in the storage 1130. The computer readable instructions stored in the storage 1130 may be loaded into the memory 1120 in order to be executed by the processing unit 1110.

In addition, the computing device 1100 includes an input device (or input devices) 1140 and an output device (or output devices) 1150. The input device 1140 includes, for example, a keyboard, a mouse, a pen, a voice input device, a touch input device, an infrared camera, a video input device, or any other input device. Further, the output device 1150 includes, for example, one or more displays, a speaker, a printer, or any other output device. In addition, the computing device 1100 may use an input device or an output device included in another computing device as the input device 1140 or the output device 1150.

Further, the computing device 1100 includes a communication connection (or communication connections) 1160 that enables communication with other devices, for example, a computing device 1300, via a network 1200. The communication connection 1160 may include a modem, a network interface card (NIC), an integrated network interface, a radio frequency transmitter/receiver, an infrared port, a universal serial bus (USB) connection, or other interfaces for connecting the computing device 1100 to other computing devices. Further, the communication connection 1160 may include a wired connection or a wireless connection.

The respective components of the computing device 1100 described above may be connected to one another by various interconnections (for example, a peripheral component interconnect (PCI), a USB, firmware (IEEE 1394), or an optical bus architecture, and may also be interconnected by a network.

The terms such as a "component", a "module", a "system", an "interface", or the like, used in this disclosure generally refer to computer-related entities that are hardware, a combination of hardware and software, software, or software in execution. For example, the component may be a process running in a processor, a processor, an object, an executable file, an execution thread, a program, and/or a computer, but is not limited thereto. For example, both of an application running on a controller and a controller may be components. One or more components may reside within a process and/or an execution thread, and the components may be localized in one computer and distributed among two or more computers.

As set forth above, according to the embodiments disclosed herein, the data throughput required for the image correction may be reduced, the power and time consumption due to the image correction may be reduced, the noise due to the image correction may be reduced, and the signal-to-noise ratio may be improved.

The image intensity processor 110, the weight coefficient processor 120, the correction transfer processor 130, the corrector 140, the processor 1110, the memory 1120, the storage 1130, the input device(s) 1140, the output device(s) 1150, the communication connection(s) 160, the network 1200, and the computing device 1300 in FIGS. 1 and 4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image correction apparatus, comprising:
an image correction processor configured to
generate an image intensity gradient for each of areas of a pre-corrected image,
generate a weight coefficient that is dependent on the image intensity gradient,
generate a correction transfer function in which the weight coefficient is applied,
generate an output value of a corrected image from an image intensity by applying the correction transfer function, and
generate the corrected image based on the output value.

2. The image correction apparatus of claim 1, wherein the image correction processor is further configured to
perform a Fourier transform on the image intensity,
calculate the output value corresponding to the product of the Fourier transformed image intensity and the correction transfer function, and
perform an inverse Fourier transform on the output value.

3. The image correction apparatus of claim 1, wherein the image correction processor is further configured to generate the correction transfer function using either one or both of Tikhonov regularization and Gaussian regularization.

4. The image correction apparatus of claim 3, wherein
the image correction processor is further configured to apply the generated weight coefficient to either one or both of a weight coefficient of the Tikhonov regularization and a weight coefficient of the Gaussian regularization, and
the generated weight coefficient is reduced as the image intensity gradient increases.

5. The image correction apparatus of claim 1, wherein the image correction processor is further configured to generate the weight coefficient so that a value corresponding to the image intensity gradient and the weight coefficient form either one of an exponential function and a logarithmic function.

6. The image correction apparatus of claim 1, wherein
the image correction processor is further configured to generate an average value of the image intensity gradients, and
the weight coefficient is dependent on the average value.

7. The image correction apparatus of claim 1, wherein
the image correction processor is further configured to
apply the image intensity b(x, y) to $$\nabla b = \sqrt{\left[\frac{\partial}{\partial x}b(x,y)\right]^2 + \left[\frac{\partial}{\partial y}b(x,y)\right]^2}$$

and $$w(\nabla b) = \frac{1}{1+w_{00}}\left(w_{00} + \exp\left\{\frac{-[\nabla b]^2}{\sigma^2}\right\}\right)$$

to generate the weight coefficient w(∇b),
generate an average value of the image intensity gradients, and
change either one or both of $w_{00}$ and σ in response to the average value changing, and
$w_{00}$ is a bias value and σ is a reference value.

8. The image correction apparatus of claim 1, further comprising:
a memory storing a first equation, a second equation, a third equation, and a fourth equation,
wherein the image correction processor is configured to
receive the first equation, the second equation, the third equation, and the fourth equation from the memory,
generate the image intensity gradient using the first equation,
generate the weight coefficient using the second equation,
generate the correction transfer function using the third equation, and
calculate the output value using the fourth equation.

9. The image correction apparatus of claim 1, wherein the image correction processor comprises:
an image intensity processor configured to generate the image intensity gradient;
a weight coefficient processor configured to generate the weight coefficient;
a correction transfer function processor configured to generate the correction transfer function; and
a corrector configured to generate the output value of the corrected image.

10. A non-transitory computer-readable storage medium storing instructions that, when executed by a processor, cause the processor to perform an image correction method by:
generating an image intensity gradient for each of areas of a pre-corrected image;
generating a weight coefficient that is dependent on the image intensity gradient;
generating a correction transfer function in which the weight coefficient is applied;
generating an output value of a corrected image from an image intensity by applying the correction transfer function; and
generate the corrected image based on the output value.

11. A method to perform image correction, comprising:
generating an image intensity gradient for each of areas of a pre-corrected image;
generating a weight coefficient based on the image intensity gradient;
generating a correction transfer function comprising the weight coefficient;
generating an output value from an image intensity by applying the correction transfer function; and
correcting the pre-corrected image based on the output value.

12. The method of claim 11, wherein the correcting of the pre-corrected image comprises correcting a first area, among the areas, at a correction level that is higher than a correction level of a second area, among the areas.

13. The method of claim 12, wherein the image intensity gradient of the first area is smaller than the image intensity gradient of the second area.

14. The method of claim 11, wherein the output value is based on a Fourier transform of the image intensity.

* * * * *